(12) United States Patent
Kato

(10) Patent No.: US 11,477,210 B2
(45) Date of Patent: Oct. 18, 2022

(54) MOUNTING MACHINE MANAGEMENT SYSTEM

(71) Applicant: FUJI CORPORATION, Chiryu (JP)

(72) Inventor: Naohiro Kato, Okazaki (JP)

(73) Assignee: FUJI CORPORATION, Chiryu (JP)

( * ) Notice: Subject to any disclaimer, the term of this patent is extended or adjusted under 35 U.S.C. 154(b) by 358 days.

(21) Appl. No.: 16/609,012

(22) PCT Filed: May 11, 2017

(86) PCT No.: PCT/JP2017/017928
§ 371 (c)(1),
(2) Date: Oct. 28, 2019

(87) PCT Pub. No.: WO2018/207328
PCT Pub. Date: Nov. 15, 2018

(65) Prior Publication Data
US 2020/0145429 A1    May 7, 2020

(51) Int. Cl.
*G06F 21/00* (2013.01)
*H04L 9/40* (2022.01)
*H05K 13/08* (2006.01)

(52) U.S. Cl.
CPC ......... *H04L 63/108* (2013.01); *H05K 13/089* (2018.08); *H05K 13/0882* (2018.08)

(58) Field of Classification Search
CPC ... H04L 63/108; H04L 63/083; H04L 63/101; H04L 63/18; H05K 13/0882; H05K 13/089; H05K 13/00
See application file for complete search history.

(56) References Cited

U.S. PATENT DOCUMENTS 6,754,829 B1 * 6/2004 Butt ................... G06F 21/33
726/8
10,171,439 B2 * 1/2019 Camenisch ......... H04L 63/0876
(Continued)

FOREIGN PATENT DOCUMENTS

CN         105069876 A      11/2015
DE    10 2015 200 209 A1    7/2016
(Continued)

OTHER PUBLICATIONS

Extended European Search Report dated Mar. 13, 2020, in Patent Application No. 17909213.5, 8 pages.

*Primary Examiner* — Kendall Dolly
(74) *Attorney, Agent, or Firm* — Oblon, McClelland, Maier & Neustadt, L.L.P.

(57) ABSTRACT

A mounting machine management system in which a management server, a terminal device, and a mounting machine are connected via a communication network such that communication is possible. The management server is provided with an authorization ID transmitting device configured to transmit an authorization ID that allows operation required for adjustment of the mounting machine to the terminal device and the mounting machine. The mounting machine is provided with an authorization ID acquiring device configured to acquire the authorization ID that the terminal device received from the management server, and an operation permitting device configured to allow the operation required for adjustment of the mounting machine in a case in which the authorization ID acquired by the authorization ID acquiring device matches the authorization ID that the mounting machine received from the management server.

9 Claims, 6 Drawing Sheets

(56) References Cited

U.S. PATENT DOCUMENTS

| | | | |
|---|---|---|---|
| 2005/0010756 A1 | 1/2005 | Clerc | |
| 2009/0180141 A1* | 7/2009 | Takaishi | G03G 15/5075 358/1.15 |
| 2017/0363065 A1 | 12/2017 | Jakobs et al. | |
| 2018/0089860 A1* | 3/2018 | Ikuta | G06V 20/20 |
| 2018/0279523 A1* | 9/2018 | Nakazono | G05B 19/4065 |

FOREIGN PATENT DOCUMENTS

| | | | | |
|---|---|---|---|---|
| JP | 2003-37037 A | | 2/2003 | |
| WO | WO-2006130991 A | * | 12/2006 | H04L 63/02 |
| WO | WO2014/037993 A1 | | 3/2014 | |

* cited by examiner

MOUNTING MACHINE MANAGEMENT SYSTEM

TECHNICAL FIELD

Technology disclosed herein relates to a mounting machine management system for mounting components to a board.

BACKGROUND ART

A mounting machine for mounting components on a board is known, as disclosed in WO2014/037993 (patent literature 1). With such a mounting machine, errors may occur in component mounting due to configuration components of the machine (for example, servo motor, linear scale, etc.) deteriorating, breaking, or the like, which requires replacement of the configuration components. During replacement work, adjustment operation such as adjustment to compensate for variance that occurs due to the replacement of the component is performed. For the adjustment work, an adjustment program for the adjustment work is used, and an authorization ID (for example, a password or the like) is required to execute the adjustment program. The management of authorization IDs requires considerable care because performing adjustment work inappropriately may cause serious problems in the operation of the mounting machine.

JP-A-2003-37037 (patent literature 2) discloses a system for managing product quality information. The quality information is stored in a quality database, and in order to obtain the quality information, an authentication code for logging in to the quality database is required. The authentication code is affixed to the product and shipped with the product. The user logs in to the quality database using the authentication code and obtains quality information from the quality database.

BRIEF SUMMARY

Technical Problem

When technology disclosed in patent literature 2 is used to manage an authorization ID, the authorization ID is distributed to a user when selling the mounting machine. Therefore, the user needs to store the authorization ID until the adjustment work is performed. A user may manage many types and a large quantity of mounting machines. For such a user, it is troublesome to manage the authorization IDs for each mounting machine. In addition, it is troublesome for the user to store a large number of authorization IDs for adjustment work for which it is unknown when that adjustment work will be required. Disclosed herein is technology for improving the user's convenience by freeing the user from the need to store authorization IDs.

Solution to Problem

In a mounting machine management system of the present disclosure, a mounting machine configured to mount components on a board is capable of communicating with a management server and a terminal device via a communication network. The management server is provided with an authorization ID transmitting device configured to transmit an authorization ID that allows operation required for adjustment of the mounting machine to the terminal device and the mounting machine. The mounting machine is provided with an authorization ID acquiring device configured to acquire the authorization ID that the terminal device received from the management server, and an operation permitting device configured to allow the operation required for adjustment of the mounting machine in a case in which the authorization ID acquired by the authorization ID acquiring device matches the authorization ID that the mounting machine received from the management server.

According to the above configuration, the management server transmits the authorization ID to both the terminal device and the mounting machine. The mounting machine allows the operation required for adjustment of the mounting machine when the authorization ID received by the terminal device from the management server matches the authorization ID received by the mounting machine from the management server. As a result, since the user can acquire the authorization ID from the management server when the mounting machine adjustment work is required, the authorization ID does not need to be stored by the user. This improves convenience for the user.

DESCRIPTION OF EMBODIMENTS

Figure 1:
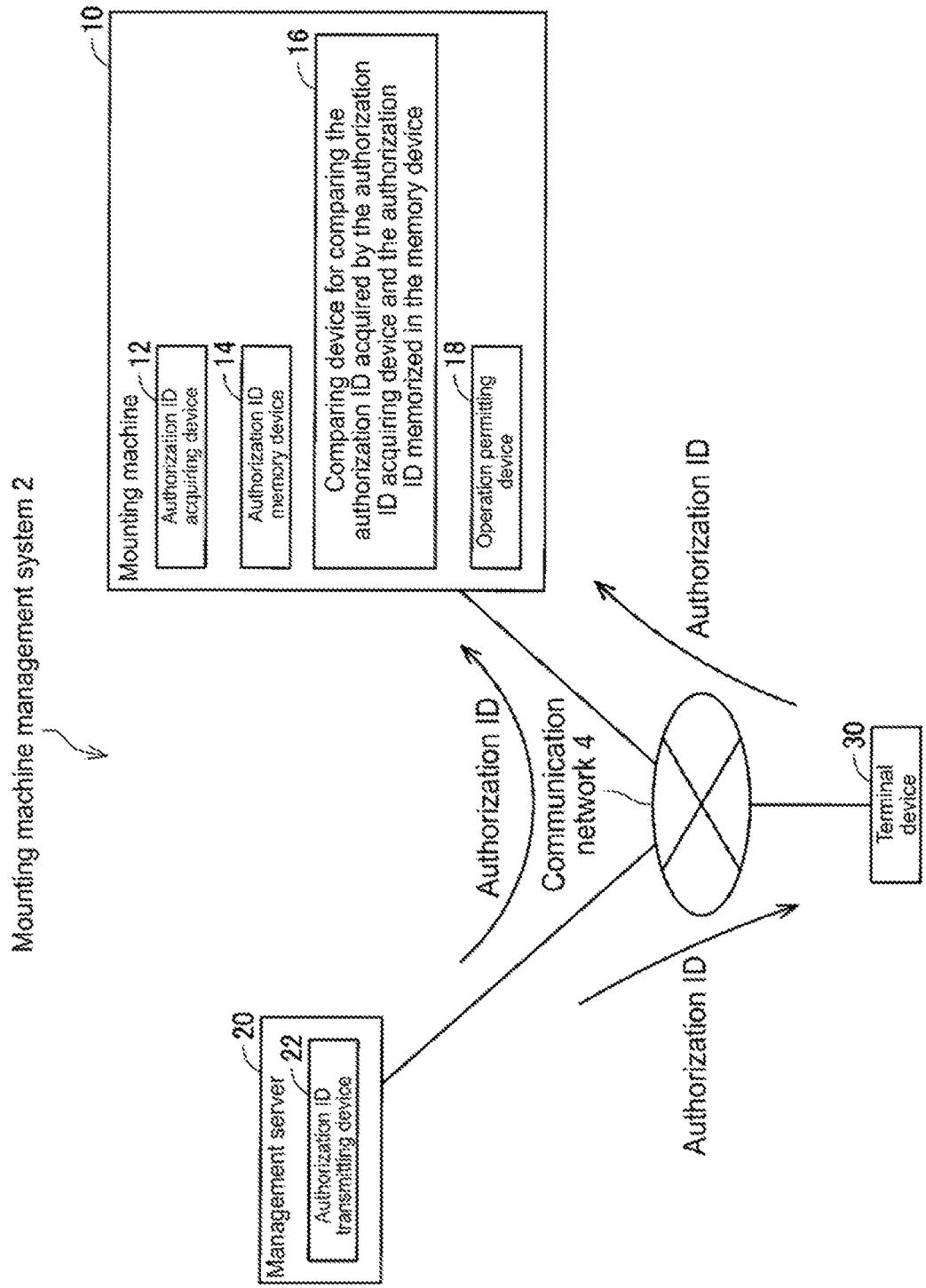
FIG. 1 schematically shows the basic structure of a mounting machine management system.

The main features of embodiments are described below as examples of the disclosure. Note that, technical elements described in this specification and in the drawings exhibit technical utility alone or in various combinations, and are not limited to the combination of the described aspects of the application.

Characteristic 1

The mounting machine is further provided with an authorization ID memory device configured to memorize the authorization ID received by the mounting machine, and an authorization ID invalidating device configured to invalidate the authorization ID memorized in the authorization ID memory device when a specified time has elapsed since the mounting machine received the authorization ID or when a quantity allowed by the operation permitting device has reached a specified quantity. In a configuration that does not include an authorization ID invalidating device, if the authorization ID becomes known by a third party, there is a long period of time in which third party can perform the mounting machine adjustment work. On the other hand, with this configuration, since the authorization ID is invalidated, even if the permission ID becomes known by a third party, there is only a short period of time in which the third party can perform the mounting machine adjustment work.

Characteristic 2

The authorization ID may be data represented by an image. In this case, the terminal device is further provided with a printing device configured to print the image representing the data, and the authorization ID acquiring device is provided with a reading device configured to read the image printed by the printing device. According to such a configuration, the mounting machine acquires the authorization ID received by the terminal device from the management server by reading an image corresponding to the authorization ID received by the terminal device from the management server. The operator can perform the mounting machine adjustment work by printing the image represented by the authorization ID received by the terminal device from the management server and causing the mounting machine to read the printed image. Compared to a case where the authorization ID is a character string such as a password, the input of the authorization ID is easy. This improves convenience for the operator. Instead of a printing device, the terminal device may include a display device for displaying images. In this case, the mounting machine may be configured to read images displayed on the display device.

Characteristic 3

The terminal device may be provided with an input device which is operated by an operator to enter an operator ID assigned to each operator and a device ID assigned to each mounting machine. Further, the management server may also be provided with a memory device configured to memorize a combination of the operator ID and the device ID, and a determining device configured to determine whether the combination of the operator ID and the device ID received from the terminal device is memorized in the memory device. When the determining device determines that the operator ID and the device ID are memorized in the memory device, the authorization ID transmitting device transmits the authorization ID. According to such a configuration, only the operator who has been assigned the operator ID registered in the management server can acquire the authorization ID for the mounting machine for which that operator is authorized. This allows only a particular operator to perform a particular mounting machine operation.

Characteristic 4

The management server may be configured to, when the combination of the device ID and the operator ID received by the management server is memorized in the memory device, transmit a program for performing operation required for adjustment of the mounting machine to the mounting machine. The operation permitting device may be configured to execute the program when the authorization ID acquired by the terminal device matches the authorization ID acquired by the mounting machine. According to such a configuration, since the mounting machine does not need to memorize the program for executing the operation required for adjustment the mounting machine, the storage capacity of the mounting machine can be made free. In addition, the adjustment program can be easily changed.

Characteristic 5

The mounting machine of the present disclosure is connected via a communication network to management server capable of communicating with a terminal device. The mounting machine is provided with an authorization ID acquiring device configured to acquire the authorization ID that the terminal device received from the management server, a memory device configured to memorize the authorization ID that the mounting machine receives from the management server, and an operation permitting device configured to allow the operation required for adjustment of the mounting machine. The operation permitting device allows operation of the mounting machine in a case in which the authorization ID acquired by the authorization ID acquiring device matches the authorization ID memorized in the memory device.

Characteristic 6

The mounting machine of the present disclosure is connected to the management server via a communication network. The mounting machine is provided with an input device configured to allow an operator to input an authorization ID, an authorization ID memory device configured to memorize an authorization ID received by the mounting machine from the management server, an authorization ID invalidating device configured to invalidate the authorization ID memorized in the authorization ID memory device when a specified time has elapsed since the mounting machine received the authorization ID or when a quantity allowed by an operation permitting device has reached a specified quantity, and an operation permitting device configured to allow an operation required for adjustment of the mounting machine. The operation permitting device allows operation of mounting machine when the authorization ID entered from the authorization ID input device matches the authorization ID memorized in the authorization ID memory device. In a configuration that does not include an authorization ID invalidating device, if the authorization ID becomes known by a third party, there is a long period of time in which third party can perform the mounting machine adjustment work. On the other hand, with this configuration, since the authorization ID is invalidated, even if the permission ID becomes known by a third party, there is only a short period of time in which the third party can perform the mounting machine adjustment work.

Characteristic 7

The mounting machine of the present disclosure is connected via a communication network to management server capable of communicating with a terminal device. The mounting machine is provided with an authorization ID acquiring device configured to capture an image that the terminal device acquired from the management server, a memory device configured to memorize the image data that the mounting machine receives from the management server, and an operation permitting device configured to allow the operation required for adjustment of the mounting machine. The operation permitting device allows operation of the mounting machine in a case in which the image captured by the authorization ID acquiring device matches the image data the mounting machine receives from the management server. With such a configuration, the operator can perform the mounting machine adjustment work by printing an image and causing the mounting machine to read the printed image. Compared to a case where the authorization ID is a character string such as a password, the input of the authorization ID is easy. This improves the convenience of the user.

Characteristic 8

The management server of the present disclosure is configured to create a system for allowing operation required for adjustment of a mounting machine only by an operator for whom registration has been competed by connecting a mounting machine configured to mount components and a terminal device via a communication network. The management server is provided with a memory device configured to memorize a device ID assigned to each mounting machine and an operator ID assigned to each operator for whom registration has been completed. When the device ID and the operator ID entered by an operator using the terminal device are memorized in the memory device, an authorization ID that allows the operation required for the adjustment of the mounting machine is transmitted to the terminal device and the mounting machine. According to such a configuration, only the operator who has been assigned the operator ID registered in the management server can acquire the authorization ID for the mounting machine for which that operator is authorized. This allows only a particular operator to perform a particular mounting machine adjustment work.

First Embodiment

The basic configuration of mounting machine management system 2 will be described with reference to FIG. 1. Mounting machine management system 2 is provided with mounting machine 10, management server 20, and terminal device 30. Mounting machine 10, management server 20, and terminal device 30 are connected to each other such that communication is possible via communication network 4.

Mounting machine 10 is provided with authorization ID acquiring device 12, authorization ID memory device 14, comparing device 16, and operation permitting device 18. Authorization ID acquiring device 12 acquires an authorization ID received by terminal device 30 from management server 20. Authorization ID memory device 14 memorizes the authorization ID that mounting machine 10 receives from management server 20. The authorization ID is information for allowing operation required for adjustment of mounting machine 10. Further, comparing device 16 compares the authorization ID acquired by authorization ID acquiring device 12 and the authorization ID memorized in authorization ID memory device 14. Operation permitting device 18 allows the operation required for adjustment of mounting machine 10 when comparing device 16 determines that the two authorization IDs match.

Management server 20 is provided with authorization ID transmitting device 22. Authorization ID transmitting device 22 transmits the authorization ID to mounting machine 10 and terminal device 30.

With mounting machine management system 2, management server 20 transmits the authorization ID to both mounting machine 10 and terminal device 30 using authorization ID transmitting device 22 via communication network 4. Continuing, mounting machine 10 memorizes the authorization ID received from management server 20 on authorization ID memory device 14. Further, mounting machine 10 acquires the authorization ID received by terminal device 30 from management server 20 using authorization ID acquiring device 12. If comparing device 16 determines that the two authorization IDs match, mounting machine 10 uses operation permitting device 18 to allow operation required for adjustment of mounting machine 10 to be performed.

Figure 2:
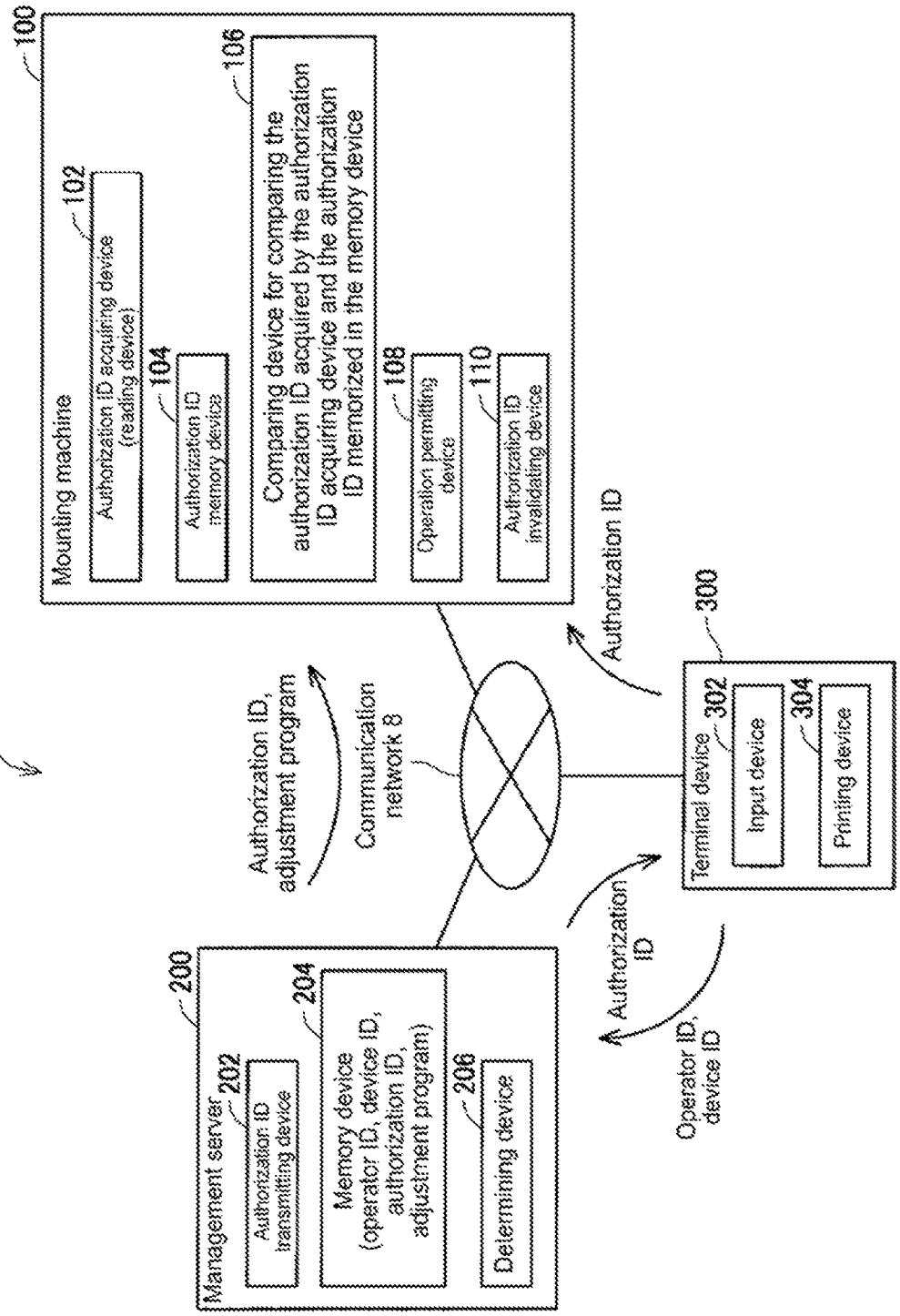
FIG. 2 shows the configuration of the mounting machine management system of an embodiment.

Mounting machine management system 6 of an embodiment will be described with reference to FIG. 2. Mounting machine management system 6 is provided with mounting machine 100, management server 200, and terminal device 300. Mounting machine 100, management server 200, and terminal device 300 are connected to each other such that communication is possible via communication network 8. Compared to mounting machine management system 2 of FIG. 1, various configurations have been added to mounting machine management system 6 of FIG. 2. The essential parts of the technology of the present disclosure are provided by both mounting machine control systems 2 and 6.

Configuration of Mounting Machine 100

Mounting machine 100 is a device for mounting components on a board. Mounting machine 100 is also referred to as a surface mounting machine or a chip mounter. Typically, mounting machine 100 is set up with a solder printer, other mounting machines, and board testers to form a mounting line.

Mounting machine 100 is provided with authorization ID acquiring device 102, authorization ID memory device 104, comparing device 106, operation permitting device 108, and authorization ID invalidating device 110. Authorization ID acquiring device 102 is a reading device for reading an image. Each of the devices 104 to 108 is similar to the respective devices 14 to 18 of mounting machine 10 of FIG. 1. Authorization ID invalidating device 110 invalidates the authorization ID memorized in authorization ID memory device 104 when a specified time has elapsed since mounting machine 100 received the authorization ID from management server 200, or when a quantity allowed by operation permitting device 108 has reached a specified quantity.

Figure 3:
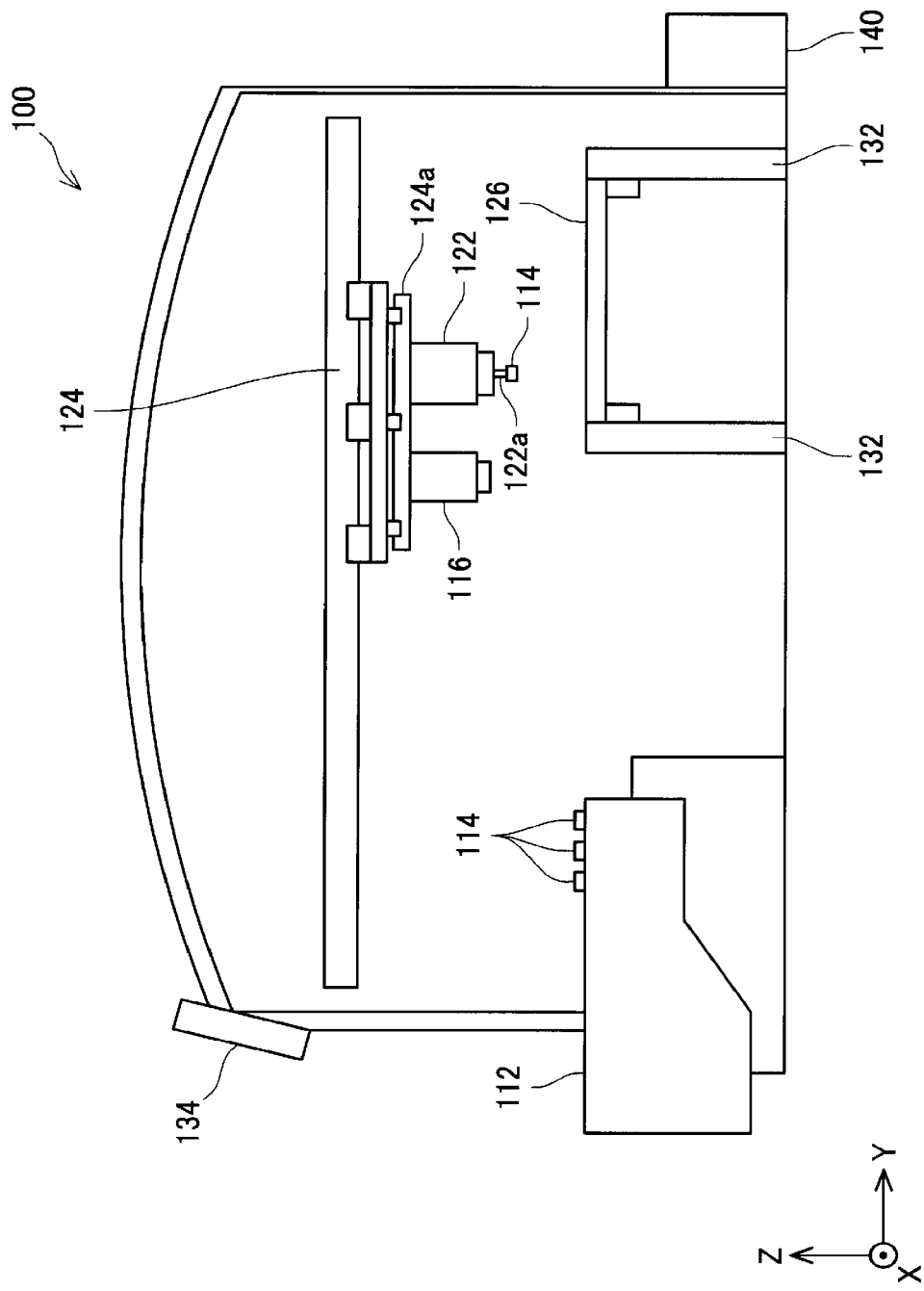
FIG. 3 is a side view schematically showing an example configuration of a mounting machine.

Further, an example of a detailed configuration of mounting machine 100 will be described with reference to FIG. 3. Mounting machine 100 is provided with component feeder 112, upper surface imaging camera 116, transfer head 122, moving device 124 for moving transfer head 122 and upper surface imaging camera 116, board conveyor 132, operation panel 134, and control device 140. Component feeder 112 houses components 114 to be mounted on board 126.

Transfer head 122 is provided with suction nozzle 122a for picking up component 114 housed in component feeder 112. Suction nozzle 122a is vertically raised and lowered by an actuator (not shown) accommodated in transfer head 122, and is configured to be able to pick up component 114.

Moving device 124 moves transfer head 122 and upper surface imaging camera 116 to and from above component feeder 112 and above board 126. Moving device 124 of the present embodiment is an XY robot for moving movement base 124a in the X direction and the Y direction. Moving device 124 is configured from items such as a guide rail for guiding movement base 124a, a moving mechanism for moving movement base 124a along the guide rail, and a motor for driving the moving mechanism.

Upper surface imaging camera 116 is attached to movement base 124a. Upper surface imaging camera 116 images the upper surface of component 114 as it is housed in component feeder 112. Upper surface imaging camera 116 also functions as a mark camera for imaging fiducial marks provided on the board.

Board conveyor 132 is a device for loading board 126 into mounting machine 100, positioning it in mounting machine 100, and unloading it from mounting machine 100. Board conveyor 132 of the present embodiment may be configured by, for example, a pair of belt conveyors, a supporting device (not shown) attached to the belt conveyors and supporting board 126 from below, and a driving device for driving the belt conveyors. Operation panel 134 is an input device for accepting instructions from an operator, and is also a display device for displaying various types of data to the operator.

Control device 140 is configured from a computer provided with a CPU, ROM, and RAM. Control device 140 is connected to component feeder 112, transfer head 122, moving device 124, upper surface imaging camera 116, and operation panel 134 such that communication is possible. Control device 140 controls component feeder 112, upper surface imaging camera 116, transfer head 122, moving device 124, and operation panel 134 to mount the components on the board.

Control device 140 has a built-in memory device. Programs for controlling operation of mounting machine 100 and information for multiple components are memorized in advance in the memory device. In the present embodiment, upper surface imaging camera 116 functions as authorization ID acquiring device 102, and the memory device in control device 140 functions as authorization ID memory device 104.

Configuration of Management Server 200

Management server 200 is, for example, a server provided by a vendor of mounting machine 100. As shown in FIG. 2, management server 200 is provided with authorization ID transmitting device 202, memory device 204, and determining device 206. Authorization ID transmitting device 202 is similar to authorization ID transmitting device 22 of management server 20.

Memory device 204 memorizes combinations of an operator ID, a device ID, an authorization ID, and an adjustment program. The operator ID is an ID assigned to each operator registered in management server 200. The device ID is an ID assigned to each mounting machine, and is, for example, a serial number or the like. The adjustment program is a program for executing the operation required for adjustment of mounting machine 100. An adjustment program corresponding to the respective mounting machine or mounting machine model is used to adjust the mounting machine. The authorization ID is information for permitting the adjustment program to be executed on the mounting machine. In the present embodiment, the authorization ID is a unique value, and is image data representing a specific image. Memory device 204 memorizes the operator ID, the device ID, the authorization ID, and the adjustment program in association with each other.

In this embodiment, terminal device 300 is a computer including a CPU, ROM, and RAM. Note that, in an alternative embodiment, terminal device 300 may be a portable terminal device such as a mobile phone. Terminal device is provided with input device 302 and printing device 304. Input device 302 is an input device such as a keyboard that an operator uses to input an operator ID and a device ID. Printing device 304 is, for example, a printer having a print function capable of communicating with terminal device 300. Instead of a printing device, a display device for displaying images corresponding to the authorization ID may be used.

An overview of the information communicated between the devices in mounting machine management system 6 will be described below. Terminal device 300 transmits operator IDs and device IDs to management server 200. Next, management server 200 transmits the authorization ID and the adjustment program to mounting machine 100, and transmits the authorization ID to terminal device 300. Mounting machine 100 memorizes the authorization ID received from management server 200, and acquires the authorization ID received from the management server by terminal device 300. If the acquired authorization ID and the memorized authorization ID match, mounting machine 100 executes the adjustment program.

Figure 4:
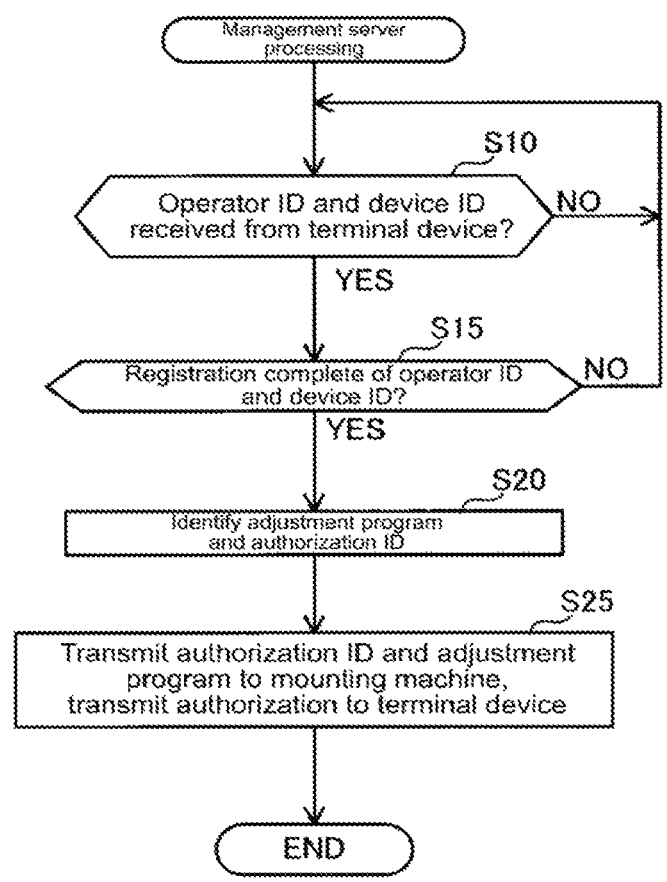
FIG. 4 is a flowchart showing processing executed by the management server.
Figure 5:
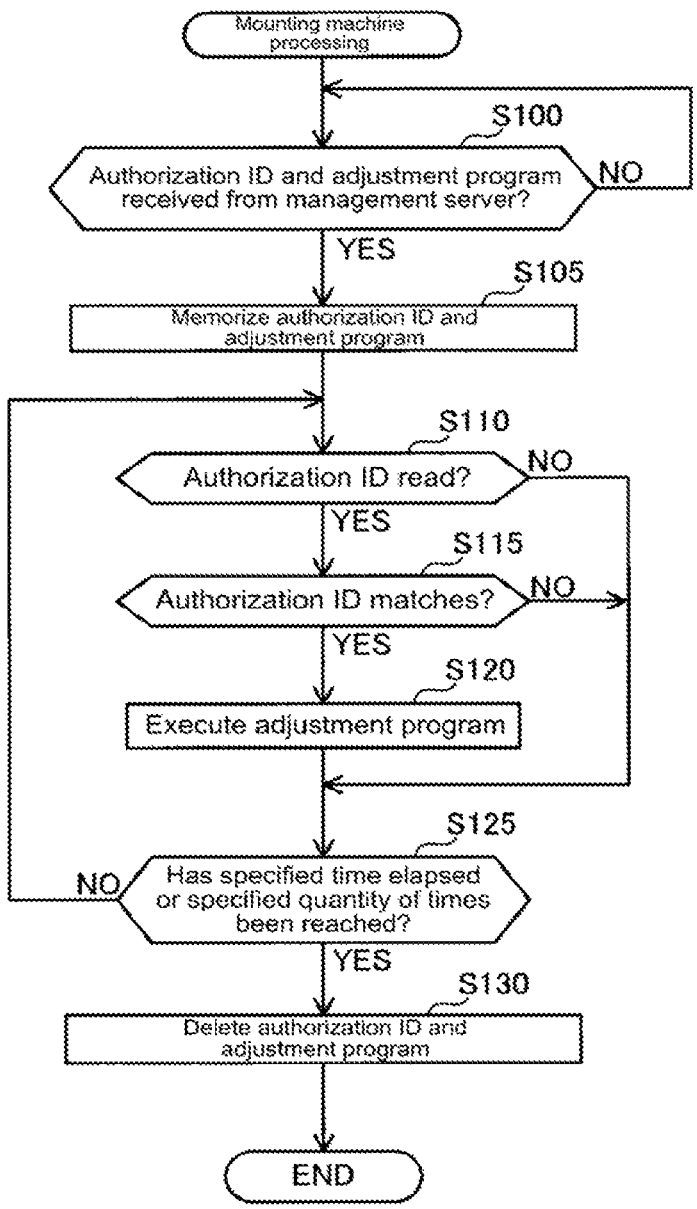
FIG. 5 is a flowchart showing processing executed by the mounting machine.

Continuing, processing performed by mounting machine 100 and management server 200 will be described with reference to FIGS. 4 and 5. FIG. 4 is a flowchart of processing performed by management server 200. Note that, the processing of FIGS. 4 and 5 is performed by the control devices of devices 100 and 200, but to simplify descriptions, devices 100 and 200 are referred to without referring to the control devices themselves. In FIG. 4, an operator uses terminal device 300 to start processing by transmitting the device ID of mounting machine 100 and the operator ID already registered in management server 200.

In S10, management server 200 monitors the reception of the operator ID and the device ID of mounting machine 100 from terminal device 300. Upon receiving the operator ID and the device ID, management server 200 determines YES in S10 and proceeds to S15; upon not receiving the operator ID and the device ID, management server 200 determines NO in S10 then repeats S10.

In S15, management server 200 determines whether a combination of the received operator ID and device ID has been registered. Specifically, management server 200 determines whether a combination of the same operator ID as the received operator ID and the same device ID as the received device ID is memorized in memory device 204. Upon determining that the received operator ID and device ID are memorized (YES in S15), management server 200 proceeds to S20; upon determining that the received operator ID and device ID are not memorized (NO in S15), management server 200 returns to S10.

In S20, management server 200 identifies, from memory device 204, the adjustment program for the mounting machine 100 adjustment and the authorization ID for allowing the execution of the adjustment program. Specifically, management server 200 uses the received device ID to identify the authorization ID and the adjustment program memorized in association with the same device ID as the received device ID from memory device 204.

In S25, management server 200 transmits the authorization ID and the adjustment program identified in S20 to mounting machine 100, and transmits the authorization ID identified in S20 to terminal device 300. Here, management server 200, since the device ID of mounting machine 100 is received from terminal device 300 in S10, is able to select mounting machine 100 as the mounting machine to which to transmit the authorization ID and the adjustment program.

Next, referring to FIG. 5, processing performed by mounting machine 100 will be described. FIG. 5 is a flowchart showing processing performed by mounting machine 100.

In S100, mounting machine 100 monitors receipt of an authorization ID and adjustment program from management server 200. Upon receiving the authorization ID and the adjustment program (YES in S100), mounting machine 100 proceeds to S105; upon not receiving the authorization ID and the adjustment program (NO in S100), mounting machine 100 repeats S100.

In S105, mounting machine 100 memorizes the authorization ID and the adjustment program received from management server 200 in authorization ID memory device 104.

In S110, mounting machine 100 monitors whether authorization ID acquiring device 102 has read the authorization ID. If authorization ID acquiring device 102 has read the authorization ID, mounting machine 100 determines YES in S110, and proceeds to S115. On the other hand, if authorization ID acquiring device 102 has not read the authorization ID, mounting machine 100 determines NO in S110, and proceeds to S125.

In S115, mounting machine 100 determines whether the authorization ID read by authorization ID acquiring device 102 matches the authorization ID memorized in authorization ID memory device 104. If determining that the two authorization IDs match, mounting machine 100 determines YES in S115 and proceeds to S120. As a result, operation permitting device 108 allows mounting machine 100 to execute the adjustment program, and in S120, mounting machine 100 executes the adjustment program. On the other hand, when mounting machine 100 determines that the two authorization IDs do not match each other, it determines NO in S115, and proceeds to S125.

In S125, mounting machine 100 monitors whether a specified period of time has elapsed since the authorization ID was received from management server 200, and whether a quantity allowed by operation permitting device 108 has reached a specified quantity, that is, whether the number of times the adjustment program has been executed has reached a predetermined number of times. Mounting machine 100 proceeds to S130 if either condition is met (YES in S125), and returns to S110 if neither condition is met (NO in S125).

In S130, mounting machine 100 deletes the authorization ID and adjustment program stored in authorization ID memory device 104. As a result, since the authorization ID is invalidated, even if the authorization ID becomes known to a third party, it is possible to curtail a situation in which the third party executes an adjustment program of mounting machine 100.

Figure 6:
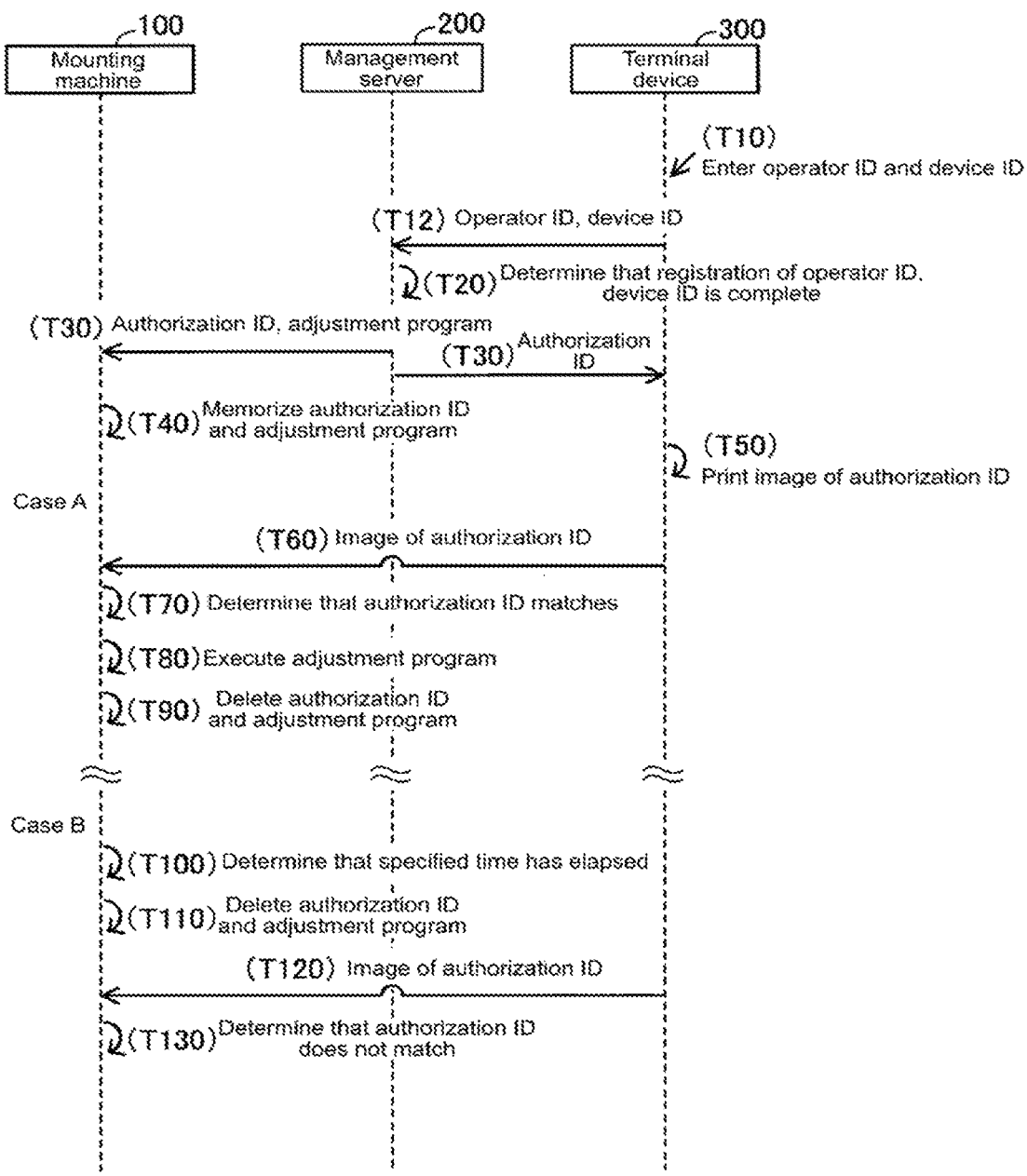
FIG. 6 is a sequence diagram showing specific processing.

Next, with reference to FIG. 6, a specific event realized by the processing of FIGS. 4 and 5 will be described. In FIG. 6, authorization ID invalidating device 110 of mounting machine 100 is set to delete the authorization ID and the adjustment program from the authorization ID memory device 104 when 24 hours have elapsed since mounting machine 100 received the authorization ID from management server 200, or when the number of times that the adjustment program has been performed reaches one. Note that, the conditions set for deleting the authorization ID and the adjustment program from authorization ID memory device 104 are examples and are not limited to these. For example, it may be set such that the authorization ID and adjustment program are deleted from authorization ID memory device 104 when the quantity that the adjustment program has been performed is three times. Alternatively, it may be set such that, when either 24 hours has elapsed since mounting machine 100 received the authorization ID from management server 200 or the quantity that the adjustment program has been performed has reached three times, the authorization ID and the adjustment program are deleted from authorization ID memory device 104.

At T10, the operator who performs adjustment work of mounting machine 100 inputs the operator ID of the operator and the device ID of mounting machine 100 using terminal device 300. As a result, at T12, terminal device 300 transmits the operator ID and the device ID input by the worker to management server 200.

At T20, management server 200 determines that the received operator ID and device ID have already been registered (YES in S15) in response to receiving the operator ID and device ID from terminal device 300 (YES in S10). Further, management server 200 uses the received device ID to identify the adjustment program and authorization ID corresponding to mounting machine 100.

At T30, management server 200 transmits the specified authorization ID to terminal device 300, and transmits the specified authorization ID and the adjustment program to mounting machine 100 (S25).

At T40, in response to receiving the authorization ID and the adjustment program from management server 200 (YES in S100), mounting machine 100 memorizes the received authorization ID and adjustment program (S105).

At T50, an operator uses terminal device 300 to print an image representing the authorization ID received by terminal device 300 from management server 200. The operator approaches mounting machine 100 with a board to which the printed image of the authorization ID has been applied. Since mounting machine 100 invalidates the authorization ID using authorization ID invalidating device 110, case A in which the authentication of the authorization ID succeeds, and case B in which the authentication of the authorization ID fails will be described below.

Case A

First, case A in which the authentication of the authorization ID succeeds will be described. At T60, the operator causes mounting machine 100 to read the printed image of the authorization ID (YES in S110). Specifically, when the operator places the board to which the image of the authorization ID has been applied on board conveyor 132 of mounting machine 100, the board is conveyed by board conveyor 132 and read by upper surface imaging camera 116.

At T70, mounting machine 100 determines that the authorization ID stored at T40 matches the authorization ID represented by the image read at T60 (YES at S115). As a result, at T80, mounting machine 100 executes the adjustment program received at T30 (S120).

At T90, mounting machine 100 determines that the quantity of time that the adjustment program has been executed has reached one, which is the specified quantity (YES at S125), then deletes the authorization ID and the adjustment program memorized at T30 (S135). As a result, mounting machine 100 does not execute the adjustment program if the same authorization ID is read again.

Case B

Continuing, case B in which the authentication of the authorization ID fails will be described. In case B, it is assumed that 24 hours or more have elapsed from T30.

At T100, mounting machine 100 determines that the specified period of time has elapsed since receiving the authorization ID and the adjustment program from management server 200 (YES in S125).

At T110, mounting machine 100 deletes the authorization ID and the adjustment program memorized at T30. As a result, even if the operator causes mounting machine 100 to read the image representing the authorization ID at T120, it is determined that the same authorization ID was not memorized at T130, and the adjustment work is not executed.

Effects of Embodiments

In the present embodiment, management server 200 transmits the authorization ID to both terminal device 300 and mounting machine 100. When the authorization ID acquired from terminal device 300 matches the authorization ID received from management server 200, mounting machine 100 allows the operation required for the mounting machine adjustment work. This eliminates the need to store the authorization ID because the authorization ID can be acquired from administration server 200 when the mounting machine 100 adjustment work is required. This improves convenience for the user.

In the present embodiment, since the authorization ID is image data, the operation of inputting a password or the like is not required. This also improves convenience for the user.

Also, in the present embodiment, when the combination of the operator ID and the device ID received from terminal device 300 has already been registered, management server 200 transmits the authorization ID to mounting machine 100 and terminal device 300. As a result, only an operator registered in management server 200 can perform adjustment work of a mounting machine 100 registered as a device corresponding to that worker. Further, in the present embodiment, mounting machine 100 includes authorization ID invalidating device 110. As a result, even if the authorization ID becomes known to a third party, since the mounting machine invalidates the authorization ID, it is possible to curtail a situation in which the third party executes adjustment work of mounting machine 100.

Further, in the present embodiment, management server 200 transmits the adjustment program together with the authorization ID to mounting machine 100. As a result, mounting machine 100 does not need to memorize the adjustment program, so memory capacity of mounting machine 100 is not taken up. Further, if the adjustment program is to be changed, the adjustment program can be easily changed by transmitting the adjustment program from management server 200 without operating mounting machine 100.

The above describes details of specific examples of the technology of this disclosure, but these are only examples and in no way restrict the claims of the disclosure. The technology disclosed in the claims include various changes and modifications to the specific examples illustrated above.

In an embodiment above, the authorization ID is image data, but the configuration is not limited to this, and the authorization ID may be a character string such as a password. In this case, an operator may enter the authorization ID using operation panel 134 of mounting machine 100.

In an embodiment above, a specified value is used as the authorization ID, but a random value may be used. In this case, management server 200 may generate an authorization ID in response to receiving the operator ID and the device ID from terminal device 300, and transmit the generated authorization ID to mounting machine 100 and terminal device 300. Further, in an alternative embodiment, authorization ID invalidating device 110 may invalidate authorization ID not by deleting the authorization ID, but by not recognizing the authorization ID.

At T30, management server 200 does not have to transmit the adjustment program with the authorization ID to mounting machine 100. In this case, mounting machine 100 may perform adjustment work by using an adjustment program memorized in advance.

Also, technical elements described in this specification and in the figures exhibit technical utility alone or in various combinations, and are not limited to the combination of the described aspects of the application. Also, the examples of the technology in this specification and the figures achieve multiple purposes at the same time but can also exhibit technical utility by achieving one among those purposes.

REFERENCE SIGNS LIST 2, 6: mounting machine management system;
4, 8: communication network;
10, 100: mounting machine;
12, 102: authorization ID acquiring device;
14, 104: authorization ID memory device;
16, 106: comparison device;
18, 108: operation permitting device;
110: authorization ID invalidating device;
112: component feeder
114: component;
116: upper surface imaging camera;
122: transfer head;
122a: suction nozzle; 124: moving device;
124a: transfer base;
126: board;
132: board conveyor;
134: operation panel;
140: control device;
20, 200: management server;
22, 202: authorization ID transmitting device;
204: memory device;
206: determination device;
30, 300: terminal device;
302: input device;
304: printing device

The invention claimed is:

1. A mounting machine management system configured to enable communication via a communication network between a management server, a terminal device, and a mounting machine, the system comprising:
the management server, which includes circuitry configured to transmit a first authorization ID that allows adjustment of operations of the mounting machine to the terminal device, and transmit the first authorization ID and a program for performing the adjustment, to the mounting machine, and
the mounting machine, which includes
a transfer head configured to mount components onto a board, and
control circuitry configured to acquire a second authorization ID, and allow execution of the received program so as to adjust the operations of the mounting machine, when determining that the acquired second authorization ID matches the first authorization ID that the mounting machine received from the management server.

2. The mounting machine management system according to claim 1, wherein the mounting machine further comprises
an authorization ID memory to store the first authorization ID received by the mounting machine, and
the control circuitry is further configured to invalidate the first authorization ID stored in the authorization ID memory when a specified time has elapsed since the mounting machine received the first authorization ID or when a quantity allowed by the operation permitting device has reached a specified quantity.

3. The mounting machine management system according to claim 1, wherein
the first authorization ID is image data,
the terminal device is provided with a printing device configured to print the image data, and the control circuitry is further configured to cause a reading device to read the image printed by the printing device.

4. The mounting machine management system according to claim 1, wherein
the terminal device includes an input device configured to be operated by an operator who inputs an operator ID and a device ID,
the management server further comprises a memory to store the operation ID and the device ID, and
the circuitry is further configured to determine whether the operator ID and the device ID received from the terminal device are stored in the memory, and when determining that the operator ID and the device ID are stored in the memory, transmit the first authorization ID.

5. The mounting machine management system according to claim 4, wherein
when the operator ID received by the management server is stored in the memory, the management server transmits the program for performing the adjustment of the mounting machine, and
the control circuitry is further configured to execute the program when the first authorization ID matches the second authorization ID.

6. A mounting machine connected via a communication network to a management server configured to communicate with a terminal device, the mounting machine comprising:
a transfer head configured to mount components onto a board;
control circuitry configured to acquire a first authorization ID that allows adjustment of operations of the mounting machine, and a program for performing the adjustment, the first authorization ID and the program being received from the management server; and
an authorization ID memory to store the first authorization ID and the program received from the management server, wherein
the control circuitry is further configured to allow execution of the program so as to adjust the operations of the mounting machine, and
wherein the control circuitry is further configured to allow the execution of the program when a second authorization ID received from the terminal device matches the first authorization ID stored in the authorization ID memory.

7. A mounting machine connected via a communication network to a management server, the mounting machine comprising:
a transfer head configured to mount components onto a board;
an authorization ID input device configured to be operated by an operator who inputs a second authorization ID that allows an operation required for adjustment of operations of the mounting machine;
an authorization ID memory configured to store a first authorization ID and a program for performing the adjustment, each received from the management server; and
control circuitry configured to allow execution of the program so as to adjust the operations required for the mounting machine, and invalidate the first authorization ID stored in the authorization ID memory when a specified time has elapsed since the mounting machine received the first authorization ID or when a quantity allowed by the control circuitry has reached a specified quantity,
wherein the control circuitry is further configured to allow the execution of the program operation when the second authorization ID input via the authorization ID input device matches the first authorization ID stored in the authorization ID memory.

8. A mounting machine connected via a communication network to a management server configured to communicate with a terminal device, the mounting machine comprising:
a transfer head configured to mount components onto a board;
an authorization ID acquiring device including an image sensor and configured to capture an image acquired by the terminal device from the management server;
a memory to store image data that the mounting machine received from the management server; and
control circuitry configured to allow execution of a program for performing adjustment of operations of the mounting machine, the program being received from the management server,
wherein the control circuitry is further configured to allow the execution of the program so as to adjust operations of the mounting machine, when the image captured by the authorization ID acquiring device matches the image data received by the mounting machine from the management server.

9. A management server configured to create a system for allowing operation required for adjustment of operations of a mounting machine only by an operator for whom registration has been completed by connecting a mounting machine configured to mount components, the mounting device including a transfer head configured to mount components onto a board, and a terminal device via a communication network, the management server comprising:
a memory to store a device ID assigned to a mounting machine and an operator ID assigned to an operator for whom registration has been completed; and
circuitry configured to transmit, to the terminal device, a first authorization ID that allows the adjustment of the operations of the mounting machine when matched with a second authorization ID, and transmit the first authorization ID and a program for performing the adjustment to the mounting machine, when the operator ID and the device ID are stored in the memory by the operator using the terminal device to input the operator ID and the device ID.

* * * * *